(12) United States Patent
Hoeting

(10) Patent No.: US 6,217,219 B1
(45) Date of Patent: *Apr. 17, 2001

(54) BEARING SEAL WITH UNIFORM FLUID PURGE

(75) Inventor: Stephen C. Hoeting, Cincinnati, OH (US)

(73) Assignee: Setco Sales Co., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/394,763

(22) Filed: Sep. 13, 1999

Related U.S. Application Data

(63) Continuation-in-part of application No. 09/036,438, filed on Mar. 9, 1998, now Pat. No. 5,980,155, which is a continuation of application No. 08/804,015, filed on Feb. 21, 1997, now Pat. No. 5,727,095.

(51) Int. Cl.[7] ............................. F16C 33/76; F16J 15/40
(52) U.S. Cl. ........................ 384/478; 277/399; 277/402; 277/408
(58) Field of Search ..................................... 384/478, 477, 384/481, 482, 483, 484; 277/399, 402, 408

(56) References Cited

U.S. PATENT DOCUMENTS

| | | |
|---|---|---|
| 2,981,490 | 4/1961 | Conley . |
| 3,512,853 | 5/1970 | Petros . |
| 3,514,114 | 5/1970 | Monahan . |
| 3,572,855 | 3/1971 | Weichsel . |
| 3,576,289 | 4/1971 | Funk et al. . |
| 3,934,311 | 1/1976 | Thompson . |
| 4,225,144 | 9/1980 | Zitz et al. . |
| 4,565,378 | 1/1986 | Wehrfritz et al. . |
| 4,568,090 | 2/1986 | Westemeier . |
| 4,603,865 | 8/1986 | Bien . |
| 4,790,543 | 12/1988 | Wittmeyer et al. . |
| 4,817,966 | 4/1989 | Borowski . |
| 4,852,890 | 8/1989 | Borowski . |
| 4,984,811 | 1/1991 | Kuwabara et al. . |
| 4,986,552 | 1/1991 | Anzue et al. . |
| 4,989,883 | 2/1991 | Orlowski . |
| 5,038,631 | 8/1991 | Renk et al. . |
| 5,069,461 | 12/1991 | Orlowski . |

(List continued on next page.)

FOREIGN PATENT DOCUMENTS

| | | |
|---|---|---|
| 0 860 637 A1 | 8/1998 | (EP) . |
| 2 253 017 | 8/1992 | (GB) . |
| WO 88/04379 | 6/1998 | (WO) . |

OTHER PUBLICATIONS

InPro, InPro/Seal Bearing Isolators and Air Purge Sealing, no date.

*Primary Examiner*—Thomas R. Hannon
(74) *Attorney, Agent, or Firm*—Wood, Herron & Evans, L.L.P.

(57) ABSTRACT

A bearing seal includes a bearing housing which houses a rotatable shaft, with a flange of the shaft located outside the housing and an internal annular volume residing between the bearing housing and the shaft, the annular volume bounded at one axial end by the flange. A seal resides in a recess in an outer surface of the housing, the seal including an outwardly extending resilient lip which engages the flange to close off the annular volume at the first axial end, adjacent the flange. The bearing housing includes a fluid passage which extends from an outer surface thereof to the annular volume, the passage including an innermost section oriented tangential to the annular volume. Purge fluid supplied to the annular volume via the external passage causes circumferential flow and substantially radially uniform purge fluid pressure within the annular volume. Build up of the purge fluid pressure in the annular volume eventually causes the lip to flex away from the flange to cause substantially uniform outward flow of purge fluid around the periphery of the seal, thereby to prevent ingress of contaminants.

22 Claims, 4 Drawing Sheets

U.S. PATENT DOCUMENTS

| | | |
|---|---|---|
| 5,072,949 | 12/1991 | Lopperi . |
| 5,221,095 | 6/1993 | Orlowski . |
| 5,310,264 | 5/1994 | Mishima et al. . |
| 5,378,000 | 1/1995 | Orlowski . |
| 5,380,101 | 1/1995 | Cheng-Chung . |
| 5,411,366 | 5/1995 | Rockwood . |
| 5,433,529 | 7/1995 | Hensel . |
| 5,448,120 | 9/1995 | Schaule et al. . |
| 5,490,307 | 2/1996 | Link . |
| 5,499,901 | 3/1996 | Rockwood . |
| 5,499,902 | 3/1996 | Rockwood . |
| 5,513,964 | 5/1996 | Rockwood . |
| 5,533,736 | 7/1996 | Yamaga . |
| 5,553,948 | 9/1996 | Ito . |
| 5,727,095 * | 3/1998 | Hoeting ................................ 384/478 |
| 5,980,115 * | 11/1999 | Hoeting ................................ 384/478 |

* cited by examiner

BEARING SEAL WITH UNIFORM FLUID PURGE

This application is a continuation-in-part of Applicant's U.S. Ser. No. 09/036,438 filed on Mar. 9, 1998, entitled "Bearing Seal With Uniform Fluid Purge." now U.S. Pat. No. 5,980,155 which in turn is a continuation of Applicant's U.S. Ser. No. 08/804,015 filed on Feb. 21, 1997, entitled "Bearing Seal With Uniform Fluid Purge", now U.S. Pat. No. 5,727,095.

FIELD OF THE INVENTION

This invention relates to a bearing seal, and more particularly to a bearing seal with improved capability for isolating the bearings and other internal components of a rotating shaft or machine, such as a machine tool spindle.

BACKGROUND OF THE INVENTION

In one typical machining operation, a machine tool motor rotatably drives a spindle shaft within a bearing housing, with the motor operatively coupled to one end of the spindle shaft. The opposite end of the spindle shaft extends outside of the bearing housing, and it holds a chuck or other tool-holding device which rotates with the spindle shaft to perform a machining operation on a workpiece. For precision machining operations with critical machining tolerances, the bearing housing and the rotatable spindle shaft must cooperate to precisely rotate the tool-holder about a desired axis, such as vertical or horizontal, over relatively long periods of time. For some applications, such as in the automobile industry, a machining "assembly" line may include as many as three hundred successive machining operations. If one machine tool goes down, for instance, due to machining inaccuracy resulting from problems with the spindle bearings or the spindle itself, it becomes necessary to shut down the entire line at tremendous cost to the manufacturer.

For many machine tools, one area of susceptibility is the seal between the inside of the stationary bearing housing and the rotatable spindle shaft, where the tool-holding end of the spindle shaft extends out of the housing. It is absolutely critical to maintain an effective seal at this joint.

For instance, it is extremely critical to prevent ingress of contaminant materials such as metal shavings or chips from the machined parts, machine tool coolant which is typically sprayed from a nozzle toward the position where the tool contacts the workpiece, and also to prevent the potentially harmful effects generated by humidity, pressure and/or temperature fluctuations. One such effect caused by ingress is liquid condensation. It is common for the coolant to be sprayed continuously at a relatively constant rate, and this results in coolant deflection and splashing on nearby surfaces, including the joint between rotating spindle and the bearing housing. Also, many machining operations require multiple coolant streams to be directed at the spindle, to provide continuous washing of metal chips, i.e., a coolant "chip wash". If ingress of coolant occurs, the coolant is capable of causing severe damage by washing out the lubricant grease for the spindle bearings, which can result in elevated bearing temperatures. In some extreme instances, this can result in catastrophic bearing failure.

Particularly over the past ten to fifteen years, it has become common to use labyrinth-type bearing seals to isolate the inner portions from the outer portions of a spindle shaft of a machine tool. These seals typically include a stator (sometimes referred to as a cap) which is mounted, as by press fitting, into the bearing housing, and which includes radially oriented labyrinth grooves. The labyrinth passage could be formed by the spacing between the stationary and the rotary parts. A rotor fits axially into the stator, revolves with the spindle, and is held in place on the rotating member by static drive rings and/or a tight fit. The labyrinth structure is designed to require multiple changes in fluid flow direction, with accompanying changes in fluid pressure, with the objective of minimizing the possibility of coolant ingress to the bearing. The structure also includes an expulsion port designed to expel any fluid contaminant that may work its way into the seal structure. U.S. Pat. No. 5,378,000 shows one such labyrinth-type bearing seal.

While labyrinth-type bearing seals have proven suitable for some applications, they have also experienced deficiencies in other important applications. One reason for these deficiencies relates to an increase in the performance expectations for bearing seals for machine tool spindles. More specifically, over the past five to ten years there has been an increased awareness of the potential hazards of overexposure of human operators to machine tool coolants and the particles/chips generated by machining. For this reason, and because almost all machine tool coolants are classified as hazardous materials from an environmental standpoint, there has been a movement toward enclosing the machining area of machine tools, usually within some type of movable or closable shroud or enclosure. The shroud reduces exposure of the human operator to potentially hazardous materials such as liquid coolant, machine tool lubricating oil or metal chips produced during machining operations.

Unfortunately, the increased use of such shrouds has produced some unintended adverse consequences. For instance, one noticeable effect of these machine tool shrouds has been the tendency of machine tool builders and/or operators to pay less attention to the amount of coolant necessary for use, since the shroud shields the operator from splashed or oversprayed coolant. This generally results in increased coolant usage, with a corresponding increase in the ingress susceptibility of the bearing seal because of this greater coolant volume. This is also true with respect to the use of the coolant chip wash, which may propel the chips toward the seal.

Also, depending on the particular machining operation, the orientation and/or shape of the shroud may cause an increase in the accumulation of metal chips near the bearing seal. Even though the relatively large metal chips may be too large to work their way past the seal, they may sufficiently interfere with proper operation of the seal so that during use the structure becomes more susceptible to coolant ingress.

Thus, even though a labyrinth-type bearing seal may be suitable for extended use for a particular machine tool operated under conditions prevalent ten years ago, that same bearing seal may not perform sufficiently for the same machine tool under operating conditions prevalent today. It alone can not withstand the increased coolant volume coupled with the increased accumulation of metal chips.

Other bearing seals have been used for spindles, such as rubbing seals which typically include a rubber lip. One advantage of a rubbing seal is the positive circumferential contact along the seal joint. However, rubbing seals have rotational speed limitations, due to excessive heat build up from friction which adversely affects spindle performance.

Some seal configurations have been adapted to accommodate the features of the labyrinth seal and the rubbing seal, with the labyrinth portion located closer to the joint than the rubbing seal. For some of these configurations, during operation, purge fluid from the bearing housing is introduced between the labyrinth seal portion and the rubbing seal portion to prevent ingress of coolant or other potential contaminants. While the purge fluid may improve the effectiveness of the labyrinth seal portion, the labyrinth seal joint still remains open when the purge fluid is turned off, so the labyrinth portion of the seal is still susceptible to liquid ingress. This problem is also true with respect to a labyrinth/mini-maze seal. Moreover, the use of purge fluid in combination with a labyrinth/rubbing seal structure still does not solve the heating problem of the rubbing seal, so there are still speed limitations.

Another bearing seal, disclosed in U.S. Pat. No. 4,565, 378, uses a labyrinth in combination with a rotatable contact seal, with compressed gas introduced between the contacting surfaces to lift the seal and form a gas cushion between the surfaces. During low speed operation, the contact seal is relied on to prevent ingress. During high speed operation, the gas cushion is relied on. The success of this seal depends upon centrifugal forces which cause the seal to move out of contact with the opposed contacting surface, and outflow of the compressed gas which forms the gas cushion. However, there does not appear to be any structure for assuring or maintaining uniformity in seal movement or uniformity in fluid outflow around the periphery.

Therefore, there is a need for an improved and more reliable bearing seal for machine tool spindles.

SUMMARY OF THE INVENTION

The bearing seal of the present invention provides an improved bearing seal that operates reliably under static and dynamic conditions. The bearing seal of the present invention further operates reliably under particularly adverse conditions such as heavy volumes of tool coolant and/or the heavy accumulation of metal chips. Further, the bearing seal prevents the ingress of contaminants through the bearing seal in a manner which does not concurrently introduce other potential spindle operational problems. In addition, the bearing seal of the present invention simplifies the overall structure of a bearing seal and thus, facilitates the replacement of failed seals in the field.

In accordance with the principles of the present invention and the described embodiments, the invention provides a bearing seal that prevents contaminant ingress between a rotatable shaft and a bearing housing which supports the shaft for rotation about an axis. The bearing seal has an annular cap located at a first end of the bearing housing where the shaft exits therefrom. The cap has a a radial annular internal surface spaced from the shaft and radial annular outer surface. The cap defines an annular internal volume with the shaft that is bounded by the radial outer surface and the radial internal surface. The cap further includes a passage formed therethrough which tangentially intersects an axially innermost portion of the annular volume. Thus, upon supplying pressurized purge fluid into the annular volume via the passage, a circumferentially uniform fluid pressure is generated within the annular volume.

In one aspect of the invention, the annular internal volume of the bearing seal is comprised of a plurality of annular regions having successively decreasing volumes from the internal surface to the outer surface of the end cap. Further, the annular region closest to the outer surface of the cap expands outwardly toward the outer surface of the cap. In addition, the annular regions have respective sizes causing the fluid to also move axially toward the outer surface of the cap. The annular regions have respective sizes to provide uniform pressure around the circumference of the annular internal volume and provide uniform pressure gradients around the periphery of the shaft, thereby reducing low pressure regions that promote unwanted ingress of contaminants.

The bearing seal of the present invention improves the seal capability and reliability of bearing seals, such as spindle bearing seals, by actively and uniformly preventing ingress of contaminants around the entire circumference of the spindle, under static and dynamic conditions. The uniform outward flow of purge fluid affirmatively prevents ingress of contaminants, even under adverse conditions such as heavy and continuous coolant flow or heavy buildup of metal chips.

Additionally, this invention positively prevents contaminant ingress in a manner which does not adversely affect normal rotational operation of a shaft, as for instance, a precision spindle, primarily because the seal structure promotes a circumferentially uniform pressure gradient for the purge fluid. Also, because of the relatively simple structural configuration of the seal components, this invention represents a relatively inexpensive bearing seal which may be readily adapted to spindles and to other applications, and for retrofitting these types of seals in the field.

These and other features of the invention will be more readily understood in view of the following detailed description and the drawings, which describe and illustrate a first embodiment of the invention.

DETAILED DESCRIPTION OF THE INVENTION

Figure 1:
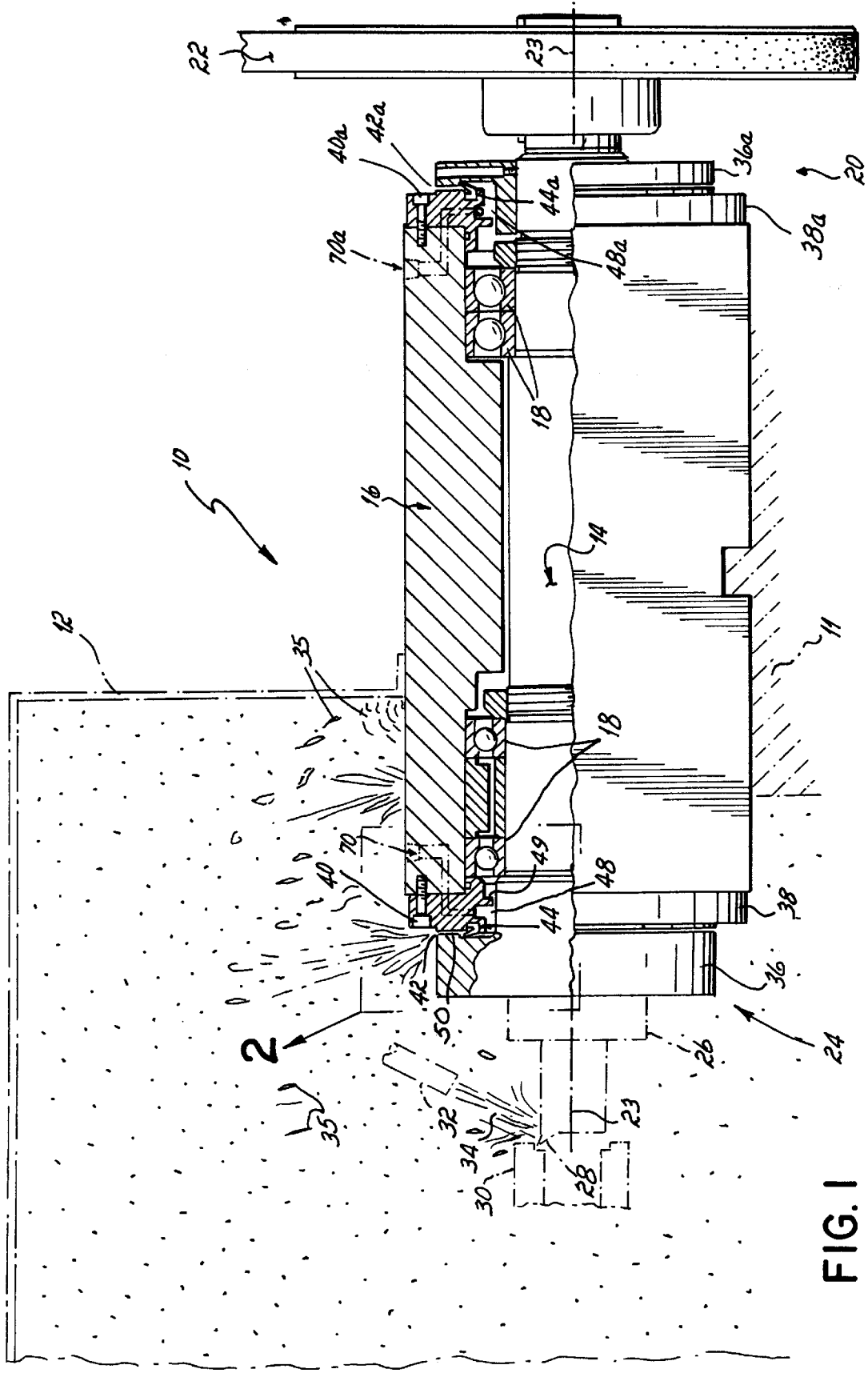
FIG. 1 is a longitudinal side view, in partial cross-section, which schematically shows a spindle, a spindle housing and a spindle bearing seal in accordance with the principles of the present invention.

FIG. 1 schematically shows a machine tool, designated generally by reference numeral 10, supported on a support surface 11 and partially enclosed by a shroud 12 to contain the machining area. The machine tool 10 includes a spindle shaft 14 housed within a spindle housing 16 and rotatable with respect thereto via spaced bearings 18. A first end 20 of the spindle shaft 14 is operatively connected to a rotatable drive mechanism. In FIG. 1, the first end 20 is operatively connected to a belt 22 which is, in turn, connectable to a motor (not shown) for rotatably driving the spindle shaft 14 about an axis 23. Although FIG. 1 shows the spindle shaft 14 as being driven by a belt 22, it is also to be understood that the invention is not limited thereby. For instance, the spindle shaft 14 may be rotatably driven by an integral motor, by gears which are, in turn, operatively connected to a gear motor or by any other type of rotatable drive mechanism which are preferably located within the housing 16.

An opposite second end 24 of the spindle shaft 14 includes a chuck 26 or other tool holding device, which, in turn, holds a tool 28 for machining the workpiece 30. FIG. 1 shows a tubular workpiece 30 and a tool 28 shaped to accommodate the tubular workpiece 30. However, it is to be understood that the invention contemplates various other types of machining tools 28 or tool holding devices 26 located at the working end 24 of a spindle shaft 14.

The machine tool 10 includes a coolant hose 32 mounted adjacent the machining area, for directing a flow of coolant stream 34 toward the location where the tool 28 contacts the workpiece 30, to reduce friction and heat build up during machining of the workpiece 30. During machining, it is common for metal chips 35 to fly off in all directions from the workpiece 30. This can result in accumulation of the chips 35 on nearby horizontal surfaces, such as the top surface of the spindle housing 16, as shown in FIG. 1.

The second end 24 of the spindle shaft 14 includes a flange 36 which is axially spaced from an annular bearing cap 38 rigidly secured to the spindle housing 16 by bolts 40. In this context, the term "annular" refers to the radially internal shape, not necessarily the external. An annular, that is, a ring-shaped space or volume, 42 resides between an internal surface 50 of the rotatable flange 36 and the stationary bearing cap 38. A seal 44 resides within a complementary-shaped recess 45 in the bearing cap 38, and the seal 44 includes a flexible lip 46 which spans the annular space 42 and contacts a region 58 of the inwardly directed surface 50 of the flange 36. The radially internal surface dimensions of the bearing cap 38 define an annular internal volume forming a purge fluid passage 48 between the spindle shaft 14 and the bearing cap 38, or more particularly, the portion of the spindle shaft 14 which resides within the housing 16. An external passage 70 extends from the annular volume 48 to the outside surface of the bearing housing 16.

In testing the invention, Applicant used a bearing cap 38 of 4142 hardstock steel, although it is believed that any one of a number of different types of steel or other materials would be suitable. The spindle flange 36 used was 4142 hardstock steel, although as with the cap 38, it is believed that any one of a number of different steels or other materials would be suitable.

At the first end 20 of the spindle shaft 14, similar components may be used to enclose the spindle shaft 14 within the spindle housing 16. Therefore, like numbers are used to identify similar components, although the suffix "a" has been appended thereto to indicate that the shape and/or dimension of these like components may be varied to accommodate slightly different structural dimensions at the first end 20 of the spindle shaft 14. Cooperative interaction of these like components is identical to the components at the second end 24, and therefore, no separate explanation of these components will be provided.

Figure 2:
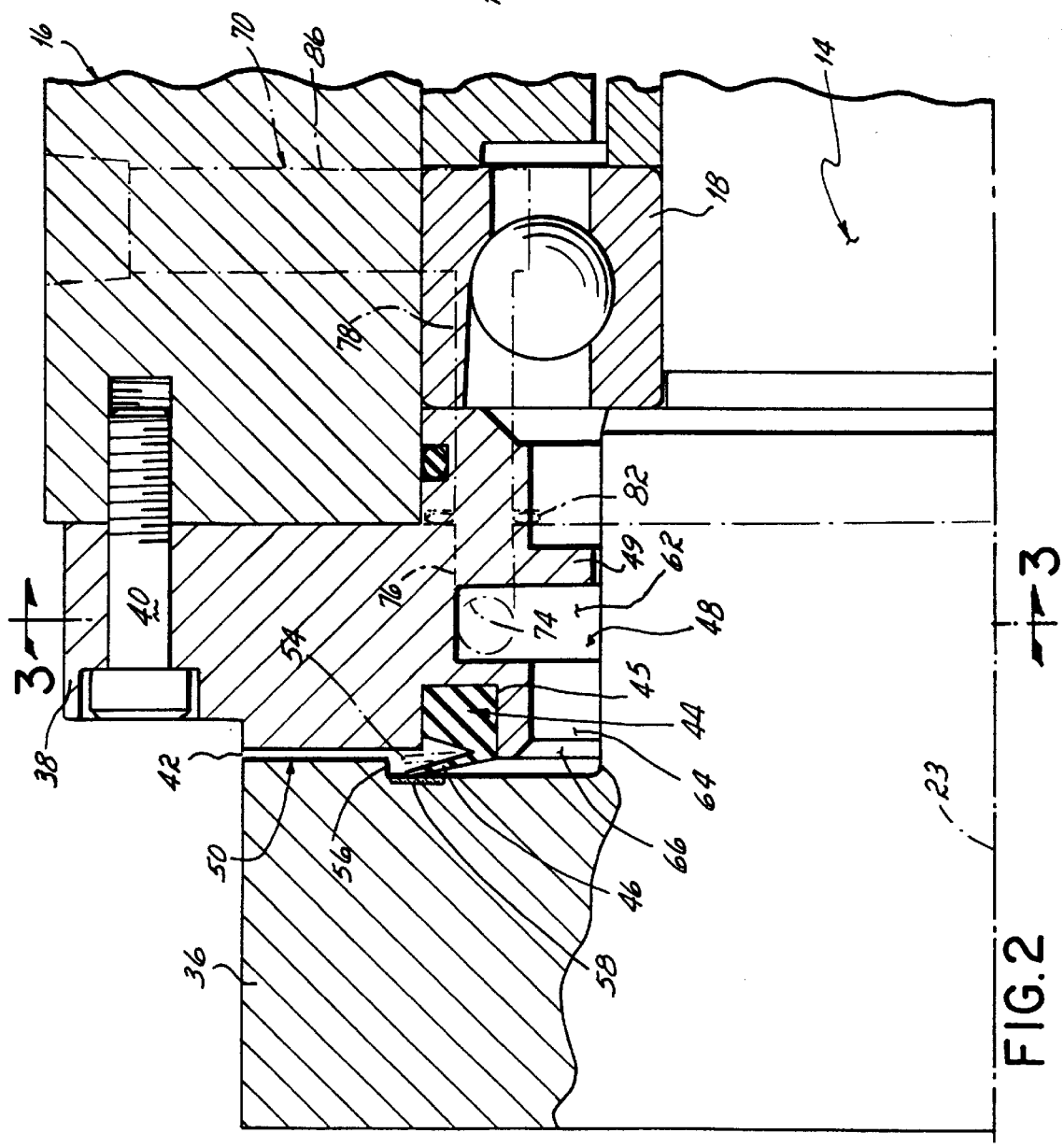
FIG. 2 is an enlarged longitudinal cross-sectional view of the area bracketed in FIG. 1.

FIG. 2 shows the flange 36, the bearing cap 38 and the seal 44 in greater detail. It is to be understood that the sealing features shown in FIG. 2, i.e., primarily the flange 36 and the lip 46, extend circumferentially around the spindle shaft 14. More specifically, FIG. 2 shows the seal 44 in a static position with the lip 46 in contact with the internal surface 50 of the flange 36 during a condition of insufficient internal fluid pressure to cause deflection. FIG. 2 also shows, in phantom, via reference numeral 54, a flexed position for the lip 46 to indicate its capability for flexing out of contact with the internal surface 50 of flange 36. This occurs under sufficient purge fluid pressure within annular volume 48 or during rotation of shaft 14 under sufficient pressure build up in combination with centrifugal force. The open space behind the lip 46 also catches chips and prevents undesirable ingress.

Various types of seals 44 may be suitable for this invention so long as the seal 44 includes a flexible lip 46 capable of flexing outwardly out of contact with the flange 36. In successful testing of the invention to date, Applicant has used a V-Ring seal supplied by C. R. Seals, particularly C. R. Stock No. 401104, which Applicant understands is made of a material commercially available from DuPont under the name Viton®. To the best of Applicant's knowledge, these V-Ring seals have not previously been mounted on the stationary portion, or stator, of a bearing seal. Rather, the structure is designed to be mounted on the rotor, because centrifugal force caused by rotation of the seal 44 (other than the lip 46) is what produces the flexing effect for the lip 46. It is important that the contact region 58 and the lip 46 be in contact at a position radially outside of the largest radius of the annular volume 48, that is, the radius of region 62 of FIG. 2. Thus, the lip 46 contacts the flange 36 at a radial dimension which is preferably greater than any other radial dimension of annular volume 48.

Because of the shape of the seal 44, coolant or contaminant flow directly into the annular space 42 will contact the lip 46, thereby urging the lip 46 into contact with the region 58. This has the effect of making the seal 44 more rigid, to enhance the localized effectiveness of the seal 44 and to help prevent contaminant ingress into the internal volume 48. If the seal 44 and lip 46 are made of a relatively stiff material, there will be less outward flow and less circumferential fluid flow with higher pressure in the volume 48. If the material for the lip 46 is more flexible, the pressure within the internal volume 48 will be somewhat lower; and the outward flow of purge fluid and the circumferential flow will be greater.

At one axial end, the annular internal volume or purge fluid passage 48 is bounded by a radial internal annular surface 47 on one side of a radially extending annular rib 49. The annular rib 49 has a relatively tight clearance, i.e., about 0.002", with the shaft 14 to prevent excessive air flow between the volume 48 and the bearing 18. At an opposite end, the annular volume 48 opens to, and is contiguous with, a radial, annular outer surface 39 of the cap 38.

Preferably, the ring-shaped space 42 has its smallest axial dimension adjacent an outer peripheral surface 33 of the flange 36. The outer diameters of the cap 38 and the flange 36 are equal to minimize deflection of chips into the ring-shaped space 42. They may even be made to angle outwardly to further minimize the occurrence of chip ingress. The internal surface 50 of the flange 36 includes a recessed portion 53 formed by an axially directed offset 55 and a radially directed contact region 58 that receives the lip 46 of the seal 44. Therefore, the offset is located radially beyond the contact region 58 of the internal surface 50. The offset 55 includes an angled annular surface or annular chamfer 56 that extends outward and towards the cap 38. The offset 55 forms a thinner outer portion of the ring-shaped volume 42 with the cap 38 and thus, minimizes the volume for possible ingress of contaminants. At the same time, the offset 55 extends over and protects the circumferential sealing edge of the lip 46 from exposure to contaminants entering the ring-shaped space 42. The chamfer 56 provides a deflection surface for outwardly expelled contaminants and also provides additional space between the flange 36 and the cap 38 to minimize the opportunity of debris from entering the internal volume 48 upon the lip 46 flexing and opening the volume 48 to atmosphere.

Preferably, this circumferential contact region 58 of the flange 36 is provided with a ceramic surface treatment prior to assembly. As a preliminary step, this region 58 is heat sprayed with a self-bonding powder such as Metco 447NS, which is a mixture of aluminum, nickel and molybdenum. Thereafter, the region 58 is heat sprayed with a ceramic bonding powder such as Metco Ceramic Powder No. 102, or another material which is believed to be an equivalent, such as PAC 702, a titanium dioxide powder. These sprays are commercially available. Preferably, in both spraying steps, the powder is sprayed on with heat, as with a thermospray gun; and except for region 58, the rest of the internal surface 50 of the flange 36 is masked, thereby to confine this surface treatment to region 58. Then the region 58 is provided with a finish grind, such as a (32) finish grind. This treatment provides a contact surface comprised of a circumferential ceramic coating with a thickness of about 0.010–0.012" for the region 58 of flange 36. This ceramic coating reduces wear between the contact region 58 and the lip 46 as would occur over time via operation of the spindle shaft 14 without sufficient fluid purge pressure to deflect the lip 46. Treatments of this type are typically used in the industry to minimize surface wear when using rubbing seals. All other surfaces preferably are provided with a (63) finish, or finer.

As noted previously, the invention contemplates mounting the seal 44 device on the rotor, i.e., the flange 36, rather than the stator, i.e., the cap 38. However, this variation would probably require that something other than the V-Ring be used as the seal 44 since rotation of the V-Ring causes flexing of the lip 46.

FIG. 2 also shows that the annular internal volume or purge fluid passage 48, which resides between the spindle shaft 14 and the bearing cap 38, actually has three distinct annular regions: a first region 62, a second region 64 and a third region 66. Again, each of these regions 62, 64, 66 has a radial dimension which is less than the radial dimension where the lip 46 contacts flange 36. The first region 62 of the volume 48 has the greatest radial dimension. Optimum fluid purge effectiveness should be determined by varying the parameters of these regions. If the first region 62 or another part of the volume 48 has too great of a radial dimension, there may be an excessive circumferential pressure and a restricted overall purge fluid flow rate. On the other hand, too small of a radial dimension may inhibit the obtaining of a uniform pressure gradient within the annular volume 48.

Figure 3:
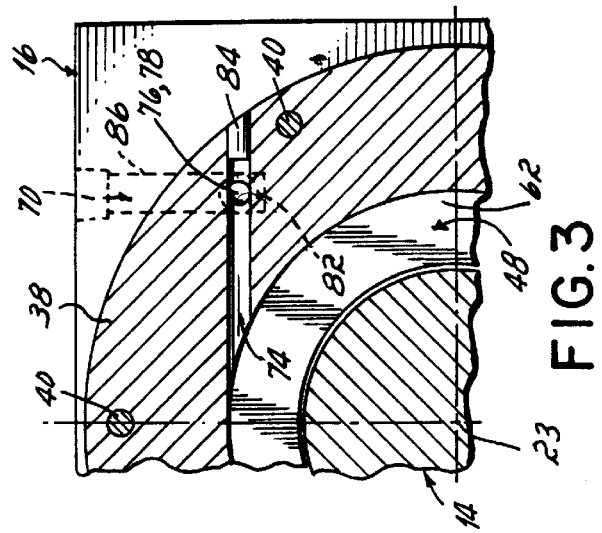
FIG. 3 is a transverse cross-sectional view taken along lines 3—3 of FIG. 2.

The bearing housing 16, which effectively includes the cap 38, has an external passage, designated generally by reference numeral 70, which extends from the internal volume 48 to outside the housing 16. More specifically, the external passage 70 includes, at its innermost section, a tangentially-directed bore 74 (tangential to first region 62, best shown in FIG. 3) and an axially-directed bore 76 formed in the bearing cap 38. The axially-directed bore 76 is aligned with an axially-directed bore 78 in the bearing housing 16, and an O-ring 82 is compressed at the interface between the bearing housing 16 and the bearing cap 38 to surround the aligned axial bores 76, 78. The axial bore 78 in the spindle housing 16 in turn communicates with a radially-oriented bore 86 in the spindle housing 16. A plug 84 (FIG. 3) caps off the end of the bore 74. A pressurized fluid source (not shown) communicates with the external passage 70 at an outer end thereof, outside the spindle housing 16, to supply pressurized purge fluid to the annular internal purge fluid passage 48.

Figure 4:
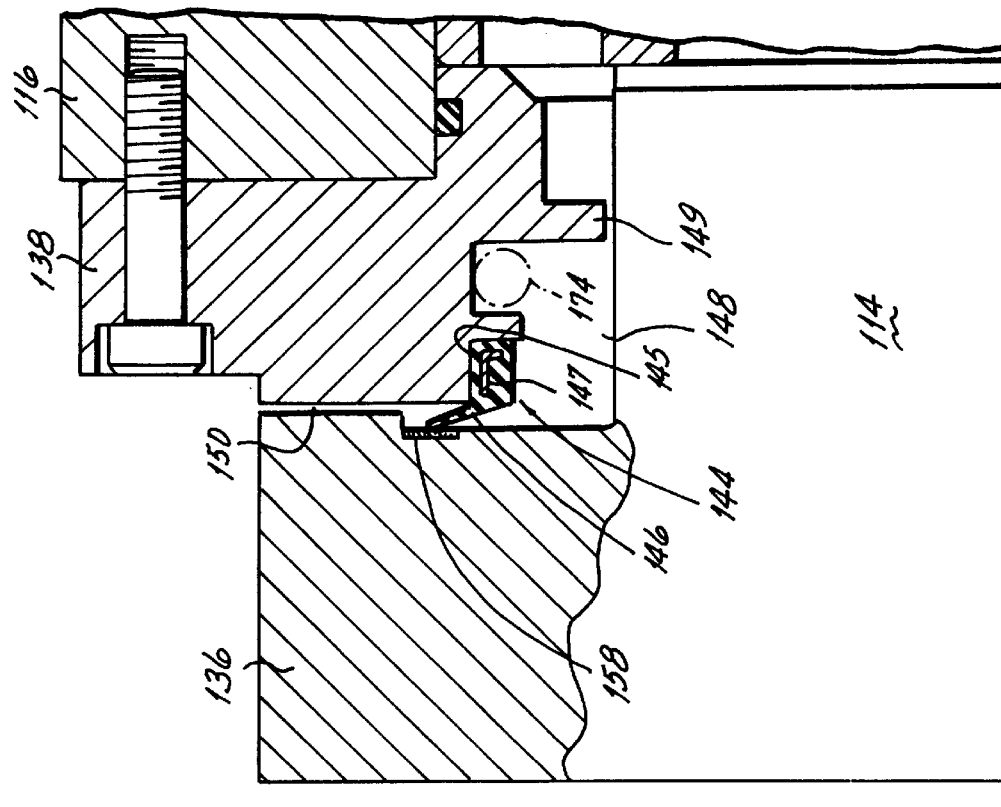
FIG. 4 is an enlarged longitudinal cross-sectional view similar to FIG. 2, showing a second embodiment of the invention.

FIG. 4 shows a second embodiment of the invention, which is of slightly simpler construction. Components similar to those of the first embodiment have the same last two numerals, but are referred to with three digit numbers in the 100's. In this embodiment, the seal 144 includes a stiff internal spine 147, such as steel or aluminum, encapsulated within a rubber or Viton type material, which is then press fit into a relatively simple ridge 145 machined in the cap 138.

Figure 5:
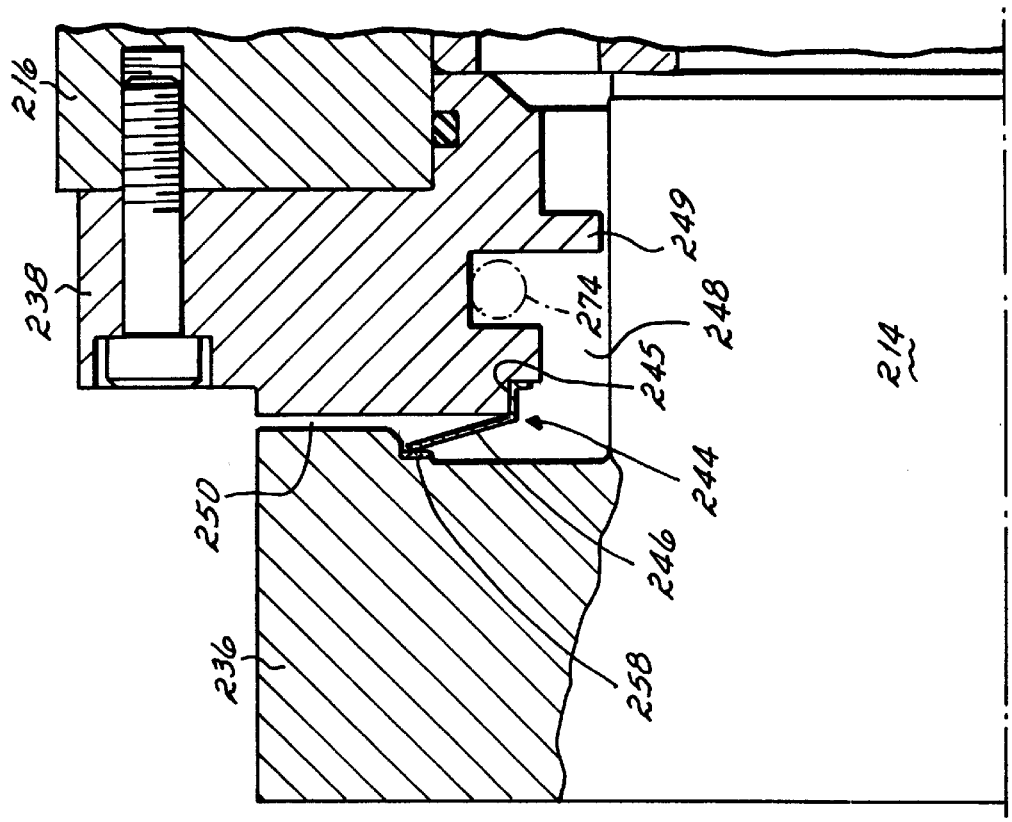
FIG. 5 is another enlarged longitudinal cross-sectional view similar to FIG. 2, showing a third embodiment of the invention.

As a further variation, FIG. 5 shows a third embodiment (with reference numerals in the 200's), wherein the seal 244 is entirely metal, such as steel or bronze. This construction may be needed if the environment will not permit a non-metallic seal.

Figure 6:
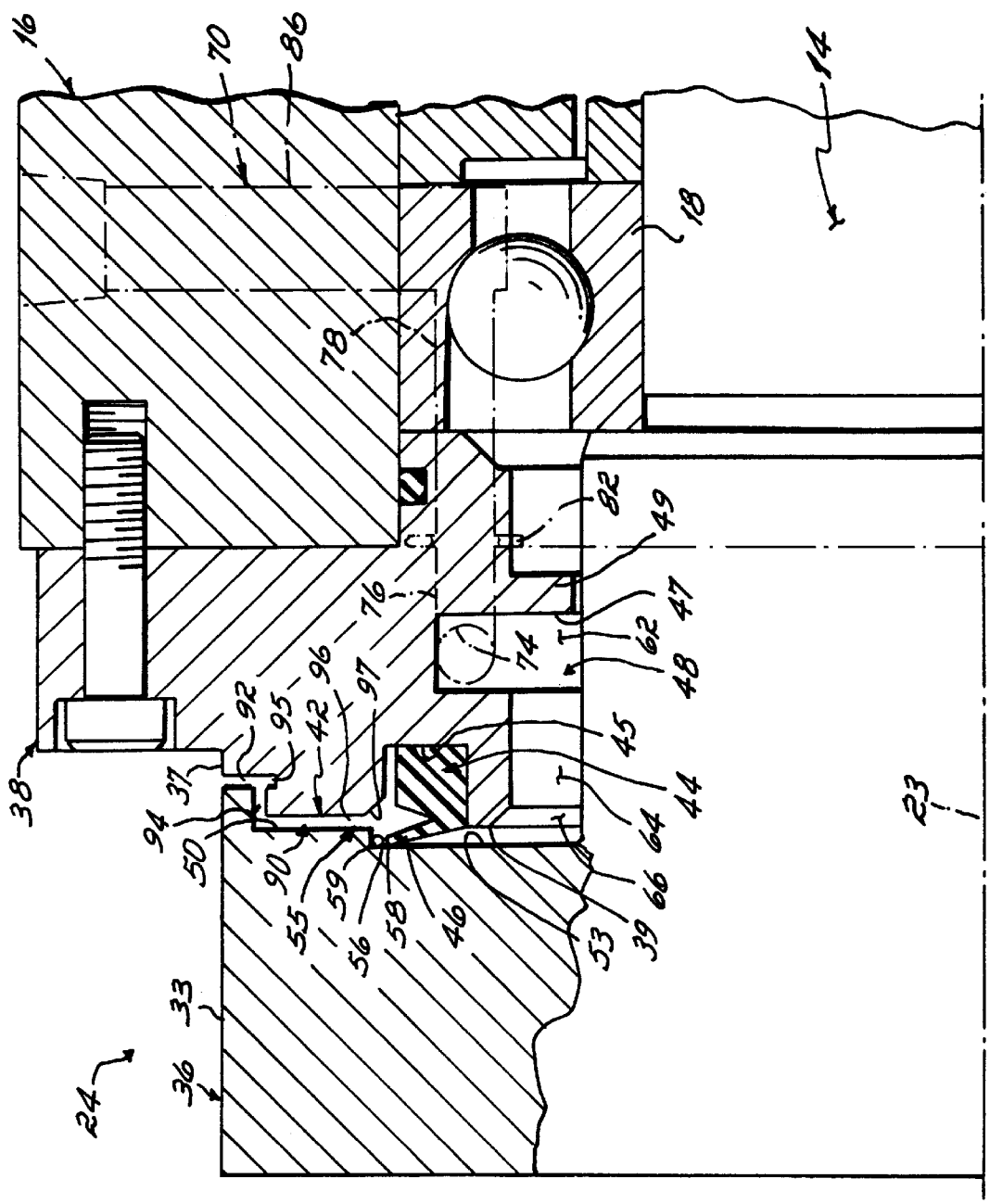
FIG. 6 is another enlarged longitudinal cross-sectional view similar to FIG. 2, showing a fourth embodiment of the invention.

FIG. 6 illustrates a further embodiment of the invention, and components similar to those previously described with respect to FIGS. 1 and 2 have the same numerical references in FIG. 6. The embodiment of FIG. 6 is distinguished first by the ring-shaped space 42 being configured as a labyrinth 90. The distance between the flange 36 and cap 38 forming the space 42 is approximately 0.9 millimeters ("mm"). The labyrinth 90 has a first portion 92 that extends from an outer peripheral surface 37 of the cap 38 radially inward toward the axis of rotation 23 to a depth of approximately 3.8 mm. The labyrinth 90 has a second portion 94 that intersects the first portion 92 and extends axially toward the flange 36. The length of the second portion 94 of the labyrinth 90 is approximately 2.9 mm. The second labyrinth portion 94 intersects the first portion 92 at a point intermediate the ends of the first portion 92, thereby forming a well 95 in the first portion 92 below the intersection with the second portion 94. The well 95 provides a channel that effectively slings coolant spray and chips out of the first portion 92 of the labyrinth 90. The labyrinth 90 has a third portion 96 having an upper end intersecting the second portion 94 of the labyrinth 90 and a lower end intersecting the offset 55.

The labyrinth 90 presents a tortuous path to prevent contaminants from entering the recessed portion 53 where the sealing lip 46 is located. Thus, the labyrinth 90 provides additional protection against the ingress of contaminants into the bearing seal portion of the bearing assembly. The outer peripheral surface 37 of the cap 38 is coextensive with the outer peripheral surface 33 of the flange 36, thereby permitting coolant spray and chips to slide over the first portion 92 of the labyrinth 90. If the outer peripheral surface 37 were at a different radius from the outer peripheral surface 33 of the flange 36, thereby forming a step or shoulder, such a step or shoulder would have a greater tendency to collect coolant spray and chips as they pass over the flange 36 and cap 38.

The embodiment of FIG. 6 has another distinguishing feature from prior embodiments in that the cap 38 contains a chamfered or relieved surface 97 that is approximately opposite the chamfered or relief surface 56. The relief surfaces 56, 97 come together at an approximately common radial point to facilitate the deflection or funneling of coolant spray, chips and other debris back out of the space 42.

It should be noted that different size spindles require different size bearing seals. As the bearing seal increases in size, the length of the flexible lip 46 increases in size and the extent to which the flexible lip lifts off the contact surface 58 also varies. To make sure that the offset 55 covers the open lip 46, the axial length of the offset 55 wilrvary with each bearing size. For example, with the smallest bearing, the surface 59 extends from the surface 58 approximately 1 mm toward the cap 38. The annular chamfered or relief surface 56 then extends at a 15° angle with respect to the axis of rotation 23, thereby providing a total axial offset length of approximately 2 mm. With a larger bearing, the axial square surface 59 may be 1.5 mm before the 15° chamfer begins, thereby providing a total axial offset of approximately 2.83 mm. As bearing sizes increase, the axial length of the squared surface 59 likewise increases.

When the spindle shaft 14 is not in use, i.e., not rotating, the lip 46 resides in contact with the flange 36 to provide a positive seal between the spindle flange 36 and the bearing cap 38 around the entire circumference. Preferably, the spindle shaft 14 is mounted such that spindle flange 36 slightly compresses the lip 46 of the seal 44, when in the static position, to provide this positive seal around the circumference of the spindle shaft 14. It is important to maintain a positive seal when the spindle shaft 14 is not operating because the coolant stream 34 may be flowed continuously during intermittent machining operations and/ or metal chips 34 may inadvertently fall or be moved into the space 42 between the flange 36 and the cap 38.

When pressurized purge fluid is supplied via the external passage 70 into the annular volume 48 during rotation of spindle shaft 14 and even during some times of non-rotation, this flow causes rotational or circumferential flow of the pressurized purge fluid, preferably, but not necessarily, in the direction of rotation of the spindle shaft 14. There is also somewhat of a spiral component to this flow, because the passage 70 supplies the purge fluid, at first region 62, at one end of the annular volume, and the purge fluid also moves axially toward the flange 36. As the pressurized purge fluid is fed into the annular volume 48, the purge fluid pressure within the annular volume 48 increases due to the continuing rotation of the fluid therein, and the fluid pressure becomes greatest at the outermost radial dimension, i.e., where the lip 46 contacts the ceramic region 58 of the flange 36. Because the pressurized purge fluid is supplied tangentially into space 48, the purge fluid flows circumferentially in the annular volume 48, and substantially uniform fluid pressure results about the entire circumference of the annular volume 48. As a result, with this structure, the tangential introduction of pressurized purge fluid, and the circumferential flow thereof, creates uniform pressure gradients around the periphery of the spindle shaft 14, thereby substantially reducing or even eliminating low pressure regions or voids which could promote unwanted ingress of contaminants.

The uniform purge fluid pressure is greatest at the circumference where the lip 46 contacts the region 58, so the purge fluid supplied to the external passage 70 at an effective flow rate and pressure will eventually cause the lip 46 to flex away from the region 58 of the flange 36. This circumferentially opens the annular volume 48 to atmosphere resulting in uniform flow of purge fluid around the entire periphery, or circumference, of the spindle shaft 14.

In testing the invention, Applicant used air with a dew point of −40° F. filtered to 5 microns as the purge fluid with a flow rate of 6–8 scfm and a pressure of 15 psig. Nevertheless, these parameters are subject to variation, depending upon the particular dimensions of the ring-shaped space 42, the type of seal 44 and lip 46 and the internal dimensions of annular volume 48. There are also some circumstances where the purge fluid may be a liquid, such as a lubricating oil. In testing, at rotational speeds up to 3600 rpm, in both directions, the purge fluid flows did not adversely affect the shaft 14 rotation.

If desired, the supply of purge fluid to the external passage 70 could be coordinated with operation of the motor (not shown), which rotatably drives the spindle shaft 14, to affect automatic turn on and turn off of the supply of pressurized purge fluid via the passage 70, although there are many instances when it is desirable to maintain the flow of purge fluid, for example, when the coolant chip wash is operated continuously. The flow rate and/or pressure of the purge fluid could be correlated to the rotational speed of the spindle shaft 14. Additionally, the purge fluid could be heated or cooled, as desired, or part of an effort to accommodate or counteract temperature increases or decreases of the rotating spindle shaft 14.

In use, under initial conditions, the lip is slightly compressed because of its engagement by the spindle flange. This results in a positive seal for the internal annular volume, around the entire circumference of the spindle. With pressurized purge fluid supplied into the annular volume via a fluid pressure source operatively connected to the external passage, during either rotational operation of the spindle or even during times of non-rotation, the tangential section of the passage causes the purge fluid to flow circumferentially around the annular volume surrounding the spindle shaft. There is also some spiral movement of the purge fluid, because the purge fluid is supplied at an axial end of the annular volume which is opposite the lip. Tangentially introducing purge fluid via this structure creates circumferentially uniform purge fluid pressure inside the annular volume.

As the purge fluid pressure inside the annular volume builds up, with this pressure being greatest at the peripheral region where the seal lip contacts the inside surface of the spindle flange, the lip eventually flexes away from the flange surface of the spindle. This opens the annular volume to atmosphere, but with an accompanying outwardly directed flow of purge fluid to actively prevent ingress of contaminants. Importantly, because of the circumferentially uniform fluid pressure in the annular volume, this outwardly directed flow of purge fluid occurs uniformly around the circumference of the spindle. During rotation of the shaft, a combination of fluid pressure build up and centrifugal force results in flexing of the lip.

Under dynamic conditions, with sufficient pressure, the uniform outflow of purge fluid actively prevents contaminant ingress. Under some static conditions, the seal itself actively prevents contaminant ingress via surface contact between the lip and flange. Also, during some other static conditions, it is beneficial to continue to use the purge fluid to prevent ingress, due to continuous flow of coolant and for chip washing.

The structural configuration of the cap, the seal and the spindle flange, including the external passage, and the flow parameters, i.e., the flow rate, pressure, temperature, humidity level, particulate level, or volume, etc., may be varied depending upon the particular circumstances of operation. For instance, the invention contemplates mounting the seal on the flange, i.e., the rotor, instead of the cap, i.e., the stator, to produce the same sealing effect under static and dynamic conditions. Also, particularly for retrofitting or even for original equipment, the invention contemplates making the stator/seal/rotor a separately available component. The stator could be designed structurally to fit into the end of a bearing housing, preferably with the external passage extending in its entirety through the stator. The rotor could then be sized to be fixedly secured, i.e., via threadable connection or a press fit, around the outer circumference of the shaft where the shaft exits the housing. Alternatively, the cap itself could be an integral part of the bearing housing, rather than a separate component. In other words, the cap refers to the end of the bearing housing regardless of whether or not it is a detachable component.

Moreover, the invention contemplates various types of purge fluid, either liquid (with various viscosities) or gas. The invention also contemplates other applications for this bearing seal since the principles of circumferentially uniform purge fluid pressure and peripherally uniform outward purge fluid flow can be applied to a wide variety of devices which employ a rotatable shaft supported by bearings and require bearing protection against egress of bearing lubricant, typically grease or small oil reservoirs, and ingress of contaminants.

If desired, one or more additional passages could be employed, with purge fluid tangentially introduced therethrough. The purge fluid could be flowed in the direction of shaft rotation, or opposite thereto, or even in both directions.

While the present invention has been illustrated by a description of various embodiments, and while these embodiments have been described in considerable detail, it is not the intention of Applicant to restrict or in any way limit the scope of the appended claims to such detail. Additional advantages and modifications will readily appear to those skilled in the art. For example, in addition to advantageous use as a bearing seal for a spindle, the invention could also be used advantageously with any other device which requires an isolation seal to isolate a rotatable shaft from bearings or other components located in a surrounding housing, such as an electric motor, a pump, a steam turbine, a fan, a blower, a gearbox, etc.

Moreover, only one particular structure for tangentially supplying purge fluid has been shown and described, and this particular structure reflects a desire to simplify the machining operations necessary to create the external passage 70 for supplying purge fluid to a spindle shaft 14 of this type. It is to be understood that numerous other structural configurations could be used to supply tangentially-directed purge fluid to the annular volume surrounding the spindle shaft 14, with one or more additional external passages 70 spaced radially about the spindle housing 16 and/or located at different axial positions near the end of the spindle housing 16. In one variation, purge fluid could be supplied from two tangential sections to generate purge fluid flow both in the direction of shaft rotation and opposite thereto.

Also, the invention contemplates retrofitting of failed seals. To accomplish this objective, or even as original equipment, it may be best to provide the flange 36/seal 44/cap 38 as a separate (rotor 36/seal 44/stator 38) component, with the stator 38 machined to a shape to conform to the bearing housing 16 with the external passage 70 extending entirely through the stator 38. The external passage 70 would communicate with an annular volume 48 of desired configuration. The rotor 36 could be press fit (with or without an O-ring therebetween) or threadably connected to the shaft 14. In this way, except for the added rotor 36, the shaft may be of uniform outer diameter. Even further, if desired, the flange 36 and the cap 38 may be of uniform outer diameter.

Thus, while embodiments of the invention has been described, it will be readily apparent to one of skill in the art that variations in these embodiments may be made without departing from the principles of the invention, the scope of which is defined by the appended claims.

What is claimed is:

1. A bearing seal for preventing contaminant ingress between a rotatable shaft and a bearing housing which supports the shaft for rotation about an axis, comprising:

an annular cap located at a first end of the bearing housing where the shaft exits therefrom, the cap having a radial internal surface spaced from the shaft and a radial outer surface and the cap defining an annular internal volume with the shaft between the internal surface and outer surface, the cap further having a passage formed there through which tangentially intersects an axially innermost portion of the annular volume, whereby upon supplying pressurized purge fluid into the annular volume via the passage, a circumferentially uniform fluid pressure is generated within the annular volume.

2. The bearing seal of claim 1 wherein the internal surface is on a radially extending rib.

3. The bearing seal of claim 1 wherein the annular internal volume is comprised of a plurality of annular regions.

4. The bearing seal of claim 3 wherein an annular region closest to the outer surface of the cap expands outwardly toward the outer surface of the cap.

5. The bearing seal of claim 3 wherein the annular regions have decreasing volumes in moving from the internal surface to the outer surface of the cap.

6. The bearing seal of claim 5 wherein the annular regions have respective sizes causing the fluid to also move axially toward the outer surface of the cap.

7. The bearing seal of claim 5 wherein the annular regions have respective sizes to provide uniform pressure around the circumference of the annular internal volume.

8. The bearing seal of claim 5 wherein the annular regions have respective sizes to provide uniform pressure gradients around the periphery of the shaft, thereby reducing low pressure regions that promote unwanted ingress of contaminants.

9. The bearing seal of claim 1 wherein the rotatable shaft includes a flange located outside of the bearing housing and spaced from the cap to form a generally ring-shaped space therebetween, the cap further having a recess formed in the outer surface thereof opposite the flange.

10. The bearing seal of claim 9 wherein the ring-shaped space 42 has its smallest axial dimension closest to an outer peripheral surface of the cap.

11. The bearing seal of claim 10 wherein the ring-shaped space has a larger axial dimension at an area of contact of the lip of the seal with the flange.

12. The bearing seal of claim 9 further comprising a seal residing within the recess in the cap, the seal including a flexible lip extending toward and circumferentially engaging the flange radially outside of the annular volume, thereby circumferentially closing off the annular volume at one axial end thereof.

13. The bearing seal of claim 12 wherein the purge fluid has a pressure greatest at a circumferential edge of the flexible lip, thereby causing the lip to flex outward to open the annular internal volume to atmosphere.

14. The bearing seal of claim 12 wherein the flange has an internal surface with a recess opposite the recess in the cap, and the recess in the flange includes an offset and a radially extending contact surface receiving the lip of the seal.

15. The bearing seal of claim 14 wherein the offset includes an annular chamfer that extends outward and towards the cap.

16. The bearing seal of claim 15 wherein the annular chamfer extends outward and towards the cap at an angle of approximately 15°.

17. The bearing seal of claim 16 wherein the recess in the cap includes an annular chamfer generally opposite the annular chamfer in the flange, annular chamfers in the flange and the cap providing deflection surfaces to outwardly expel contaminants.

18. A bearing seal for preventing contaminant ingress between a rotatable shaft and a bearing housing which supports the shaft for rotation about an axis, comprising:

an annular cap located at a first end of the bearing housing where the shaft exits therefrom, the cap having a radial internal surface spaced from the shaft and a radial outer surface and the cap defining an annular internal volume with the shaft between the internal surface and outer surface, the cap further having a passage formed there through which tangentially intersects an axially innermost portion of the annular volume, whereby upon supplying pressurized purge fluid into the annular volume via the passage, a circumferentially uniform fluid pressure is generated within the annular volume;

a flange mounted to the shaft and located outside of the housing, with a generally ring-shaped space residing between the flange and the cap; and a seal mounted on the cap and including a flexible lip extending toward and circumferentially engaging the flange radially outside of the annular volume, thereby circumferentially closing off the annular volume at one axial end thereof, whereby upon supplying pressurized purge fluid into the annular volume via the passage, a circumferentially uniform fluid pressure is generated within the annular volume, and the pressurized purge fluid exits the annular volume via the generally ring-shaped space between the flange and the cap, thereby to prevent contaminant ingress therebetween.

19. The bearing seal of claim 18 wherein the ring-shaped space forms a labyrinth between the offset and the outer peripheral surface of the cap.

20. The bearing seal of claim 18 wherein the ring-shaped space comprises:

a first portion extending radially inward from the outer peripheral surface of the cap;

a second portion intersecting the first portion and extending axially; and a third portion intersecting the second portion and extending radially inward.

21. The bearing seal of claim 20 wherein the second portion intersects the first portion at a location intermediate ends of the first portion.

22. The bearing seal of claim 21 wherein the second and third portions intersect at ends of the second and third portions.

* * * * *